United States Patent
Singh et al.

(10) Patent No.: US 10,683,914 B2
(45) Date of Patent: Jun. 16, 2020

(54) TENSIONER

(71) Applicant: GATES CORPORATION, Denver, CO (US)

(72) Inventors: Sukhdeep Singh, Lasalle (CA); Michael J. Koppeser, Windsor (CA); Anil Kumar Bhalla, London (CA)

(73) Assignee: Gates Corporation, Denver, CO (US)

( * ) Notice: Subject to any disclaimer, the term of this patent is extended or adjusted under 35 U.S.C. 154(b) by 54 days.

(21) Appl. No.: 15/896,869

(22) Filed: Feb. 14, 2018

(65) Prior Publication Data
US 2019/0249758 A1 Aug. 15, 2019

(51) Int. Cl.
F16H 7/12 (2006.01)
F16H 7/08 (2006.01)
F02B 67/06 (2006.01)

(52) U.S. Cl.
CPC ............ F16H 7/1218 (2013.01); F02B 67/06 (2013.01); F16H 7/0831 (2013.01); F16H 2007/081 (2013.01); F16H 2007/084 (2013.01); F16H 2007/0819 (2013.01); F16H 2007/0865 (2013.01); F16H 2007/0893 (2013.01)

(58) Field of Classification Search
CPC .... F16H 7/1218; F16H 7/0829; F16H 7/0831; F16H 2007/084; F16H 7/12; F16H 7/1209; F16H 2007/08; F16H 2007/081
See application file for complete search history.

(56) References Cited

U.S. PATENT DOCUMENTS

| | | | | |
|---|---|---|---|---|
| 6,059,679 A | * | 5/2000 | Tsutsui | F16H 7/1218 474/117 |
| 6,422,964 B1 | | 7/2002 | Rointru et al. | |
| 6,609,988 B1 | * | 8/2003 | Liu | F16H 7/1218 474/133 |
| 7,004,863 B2 | * | 2/2006 | Serkh | F16H 7/1218 474/109 |
| 8,142,314 B2 | | 3/2012 | Antchak et al. | |
| 8,277,348 B2 | * | 10/2012 | Lannutti | F16H 7/1218 474/135 |
| 8,403,785 B2 | | 3/2013 | Lannutti | |
| 8,439,781 B2 | | 5/2013 | Lannutti et al. | |
| RE46,019 E | | 5/2016 | Lannutti | |

(Continued)

FOREIGN PATENT DOCUMENTS

DE 102011085546 A1 6/2012
WO 2007106971 A1 9/2007

OTHER PUBLICATIONS

DE102011085546 Translation; A Traction Clamping Unit; Bauer et al; Published: Jun. 14, 2012; Espacenet (Year: 2012).*

(Continued)

Primary Examiner — Michael R Mansen
Assistant Examiner — Raveen J Dias
(74) Attorney, Agent, or Firm — Paul N. Dunlap, Esq.

(57) ABSTRACT

A tensioner comprising a base, a pivot arm pivotally engaged with the base, a pulley journalled to the pivot arm, a torsion spring urging the pivot arm, the torsion spring loaded in the unwinding direction, the torsion spring engaged with a damping shoe, the damping shoe frictionally engaging the base, and the damping shoe having a damping shoe portion comprising PTFE mixed within a plastic matrix material, the PTFE comprising between 2% and 4% of the plastic matrix material by weight.

5 Claims, 3 Drawing Sheets

(56) References Cited

U.S. PATENT DOCUMENTS

| | | | |
|---|---|---|---|
| 9,869,379 B2 | 1/2018 | Frankowski | |
| 2001/0021679 A1* | 9/2001 | Ohira | F16C 33/04 |
| | | | 474/135 |
| 2004/0014542 A1* | 1/2004 | Quintus | F16H 7/1218 |
| | | | 474/135 |
| 2005/0043130 A1* | 2/2005 | Hao | F16H 7/1218 |
| | | | 474/135 |
| 2009/0131208 A1* | 5/2009 | Hawryluck | F16H 7/1218 |
| | | | 474/135 |
| 2009/0269127 A1* | 10/2009 | Hartmann | B29C 45/0001 |
| | | | 403/119 |
| 2010/0234155 A1* | 9/2010 | Antchak | F16H 7/1218 |
| | | | 474/135 |
| 2012/0028744 A1* | 2/2012 | Hartmann | F16H 7/1218 |
| | | | 474/135 |
| 2014/0038758 A1* | 2/2014 | Jindai | F16H 7/1218 |
| | | | 474/135 |
| 2016/0215859 A1* | 7/2016 | Frankowski | F16H 7/0831 |
| 2019/0285147 A1* | 9/2019 | Singh | F16H 7/1218 |

OTHER PUBLICATIONS

Wikipedia: Nylon 46; https://en.wikipedia.org/wiki/Nylon_46 (Year: 2018).*

Wikipedia: Nylon 66; https://en.wikipedia.org/wiki/Nylon_66 (Year: 2018).*

European Patent Office, International Search Report and Written Opinion of the International Searching Authority, International application No. PCT/US2019/017293, dated Apr. 17, 2019.

* cited by examiner

TENSIONER

FIELD OF THE INVENTION

The invention relates to a tensioner, and more particularly, to a tensioner having a damping shoe comprising PTFE mixed within a plastic matrix material, the PTFE comprising between approximately 2% and 4% of the plastic matrix material by weight.

BACKGROUND OF THE INVENTION

Tensioners for flexible drive systems, and in particular for flexible drive systems comprising accessory drive systems on internal combustion engines, are well known. Such tensioners include a pulley which is biased toward the flexible drive, typically a rubber belt. The pulley is mounted to a pivot arm which is biased towards the flexible drive (the tensioning direction) by a spring and the pivot arm can also include means to produce a dampening force to inhibit oscillation of the pivot arm and/or flexible drive. Prior art tensioners which provide frictional dampening typically provide a frictional force using a damping mechanism made of materials such as plastic or metallic.

Bushings used on the prior art tensioner pivot arms may use PTFE to facilitate movement.

Representative of the art is U.S. Pat. No. 8,142,314 which discloses a tensioner which employs a spindle and a tensioner arm which are preferably manufactured by a suitable manufacturing process, such as die casting, negating a requirement for machining operations. The biasing spring of the tensioner is wound with wire having a non-circular cross section to increase the spring force of the spring compared to a similar spring wound with wire of circular cross section and, as the tensioner arm is moved away from the flexible drive, the diameter of the biasing spring expands and the coils press a dampening shoe into contact with a wall of the tensioner arm producing a dampening force. The tensioner is simple to assemble and requires a relatively small package volume for the biasing force it can produce.

What is needed is a tensioner having a damping shoe comprising PTFE mixed within a plastic matrix material, the PTFE comprising between approximately 2% and 4% of the plastic matrix material by weight. The present invention meets this need.

SUMMARY OF THE INVENTION

The primary aspect of the invention is to provide a tensioner having a damping shoe comprising PTFE mixed within a plastic matrix material, the PTFE comprising between 2% and 4% of the plastic matrix material by weight.

Other aspects of the invention will be pointed out or made obvious by the following description of the invention and the accompanying drawings.

The invention comprises a tensioner comprising a base, a pivot arm pivotally engaged with the base, a pulley journalled to the pivot arm, a torsion spring urging the pivot arm, the torsion spring loaded in the unwinding direction, the torsion spring engaged with a damping shoe, the damping shoe frictionally engaging the base, and the damping shoe having a damping shoe portion comprising PTFE mixed within a plastic matrix material, the PTFE comprising between 2% and 4% of the plastic matrix material by weight.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
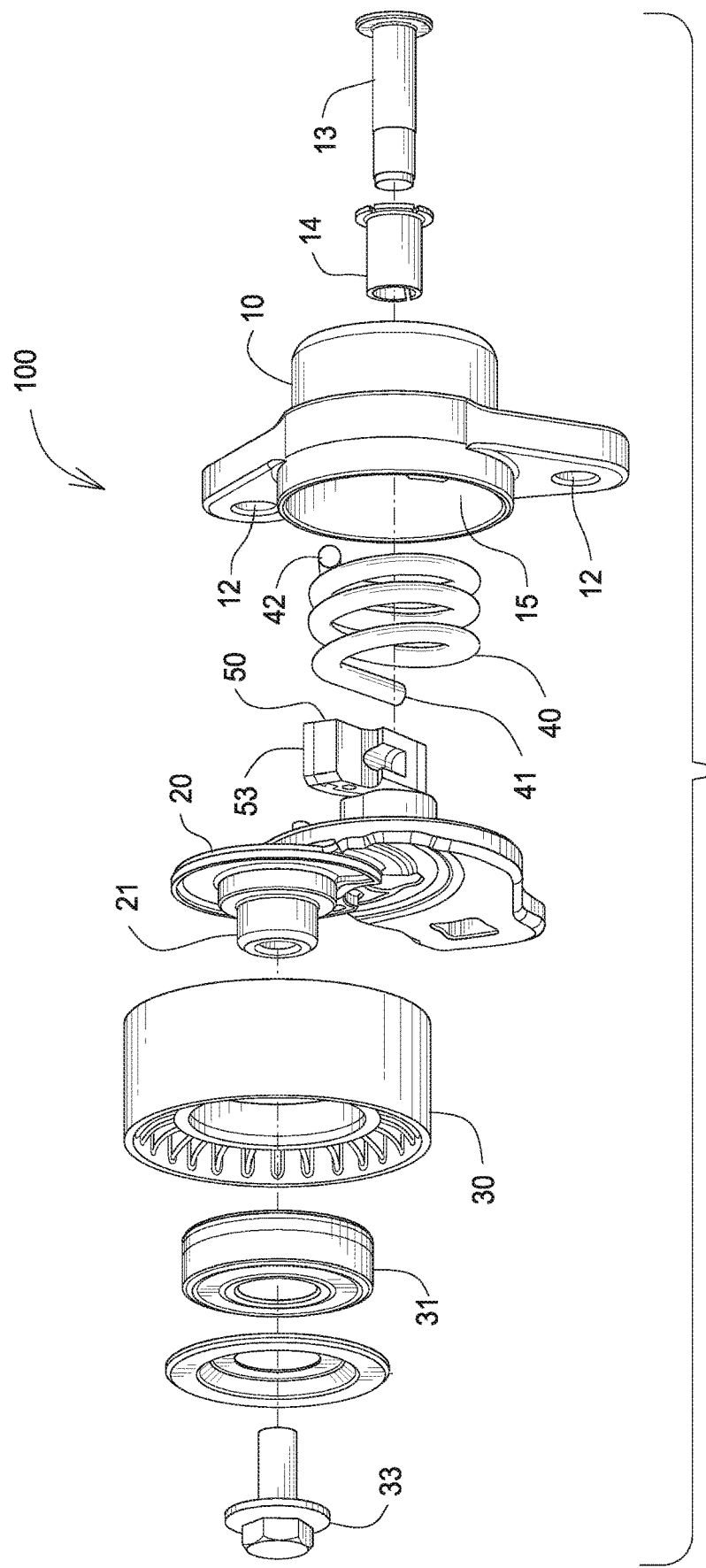
FIG. 1 is an exploded view.

FIG. 1 is an exploded view. The tensioner 100 comprises a base 10, pivot arm 20, pulley 30 and torsion spring 40. Pulley 30 is journalled to pivot arm 20 on a bearing 31. Bolt 33 attaches bearing 31 to receiving portion 21. Shaft 13 attaches pivot arm 20 to base 10. Pivot arm 20 pivots about shaft 13 on bushing 14.

End 42 of torsion spring 40 engages base 10. End 41 of torsion spring 40 engages damping shoe 50. Friction surface pad 53 of damping shoe 50 frictionally engages inner surface 15 of base 10.

Figure 2:
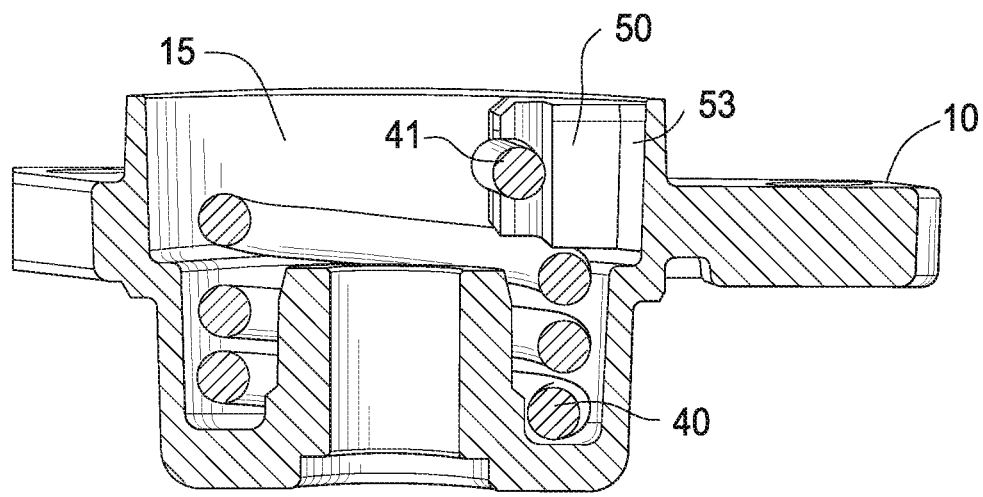
FIG. 2 is a cross sectional view.

FIG. 2 is a cross sectional view. End 41 of torsion spring 40 presses damping shoe 50 into surface 15. The frictional force is a function of the coefficient of friction between pad 53 and surface 15, and the normal force applied by spring 40. Damping of oscillatory movement of the pivot arm is realized by the generated frictional force. Torsion spring 40 is loaded in the unwinding direction, thereby radially expanding the diameter of spring 40.

Figure 3:
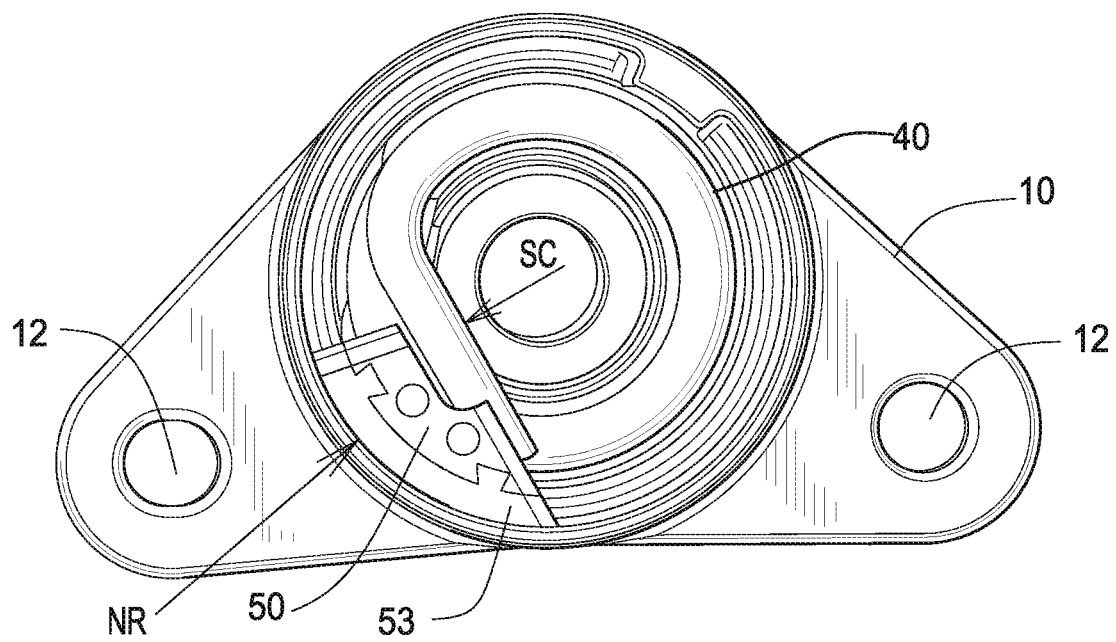
FIG. 3 is a plan view.

FIG. 3 is a plan view. A normal reaction (NR) force counters the spring contact (SC) reaction force. Holes 12 receive bolts (not shown) for mounting the tensioner to a mounting surface (not shown).

Figure 4:
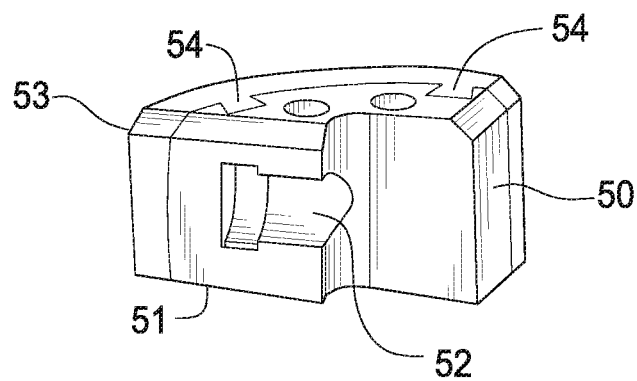
FIG. 4 is a perspective view of the damping shoe.

FIG. 4 is a perspective view of the damping shoe. Damping shoe 50 comprises a friction surface pad 53. Pad 53 is locked to body 51 by interlocking portions 54. Receiving portion 52 engages end 41 of torsion spring 40. Pad 53 comprises a nylon 66 matrix.

Figure 5:
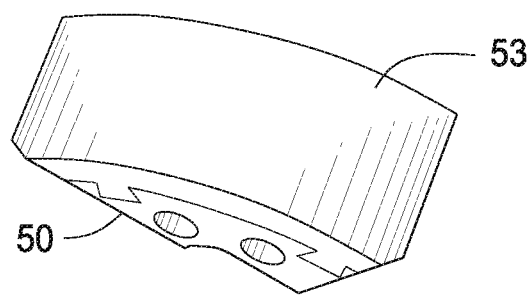
FIG. 5 is a perspective view of the damping shoe.

FIG. 5 is a perspective view of the damping shoe. Pad 53 comprises an arcuate form to engage surface 15 of base 10. Body 51 is typically plastic, but may also comprise metal or ceramic material.

Figure 6:
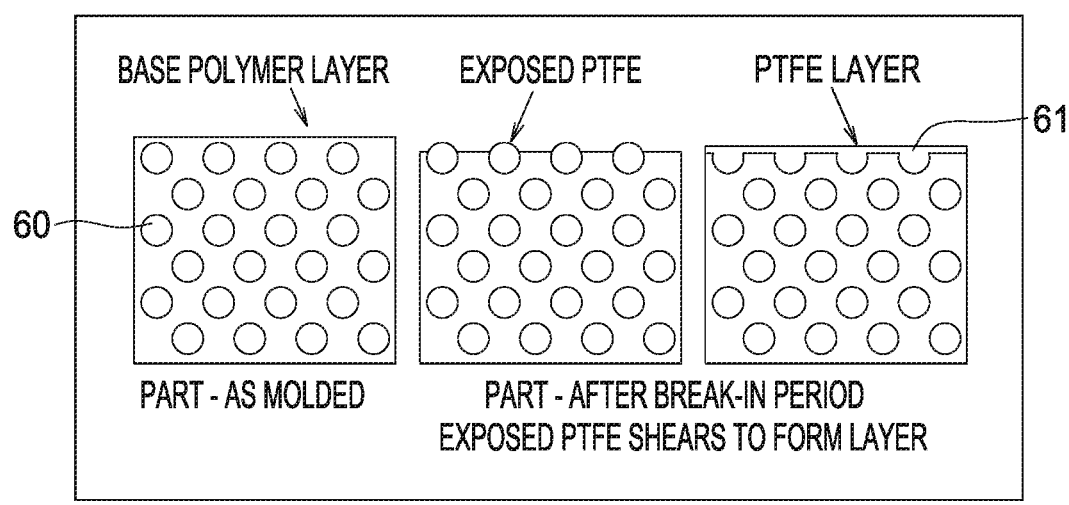
FIG. 6 is a schematic of the friction surface.

FIG. 6 is a schematic of the friction surface. PTFE 60 is mixed homogeneously with pad matrix material during molding of pad 53. The matrix material may comprise nylon 66 or other similar plastic material. PTFE is generally inert and is compatible with most forms of plastic known in the art. The PTFE content in pad 53 is in the range of approximately 2% to 4% by weight. PTFE 60 in pad 53 enhances anti-stick behavior of this damping mechanism, for example, in the presence of fluids like water.

In operation and during a break-in period pad 53 wears slightly, which then exposes the PTFE on the surface of pad 53. The exposed PTFE layer 61 wears and shears to form a lubricious surface to enhance the anti-stick behavior in the presence of fluids.

Anti-stick behavior is not analogous to the frictional engagement. Pad 53 frictionally engages surface 15 thereby damping movement of pivot arm 20. Even so, layer 61 does not diminish the frictional characteristic of the engagement; it simply reduces or prevents stick-slip behavior which may otherwise occur during operation.

Stick-slip can be described as surfaces alternating between sticking to each other and sliding over each other. Typically, the static friction coefficient between two surfaces is larger than the kinetic friction coefficient. If an applied force is large enough to overcome the static friction, then the reduction of the friction to the kinetic friction can cause a sudden jump in the velocity of the relative movement of the two surfaces.

As the tensioner operates, a PTFE film is also deposited on surface 15. The deposited PTFE film reduces wear on surface 15, thereby extending the operating life of the tensioner.

Although a form of the invention has been described herein, it will be obvious to those skilled in the art that variations may be made in the construction and relation of parts and method without departing from the spirit and scope of the invention described herein.

We claim:

1. A tensioner comprising:
   a base;
   a pivot arm pivotally engaged with the base;
   a pulley journalled to the pivot arm;
   a torsion spring urging the pivot arm, the torsion spring loaded in an unwinding direction;
   the torsion spring engaged with a damping shoe, the damping shoe frictionally engaging the base; and
   the damping shoe having a damping shoe portion comprising PTFE mixed within a plastic matrix material, the PTFE comprising between 2% and 4% of the plastic matrix material by weight.

2. The tensioner as in claim 1, wherein the plastic matrix material comprises nylon 66.

3. The tensioner as in claim 1, wherein the damping shoe engages a radially inner surface of the base, the radially inner surface receiving a film of PTFE from the damping shoe.

4. The tensioner as in claim 1, wherein the base further comprises a mounting hole.

5. The tensioner as in claim 1, wherein the damping shoe portion has an arcuate form for engaging the base.

* * * * *